J. J. WHITE & L. M. FREDERICK.
FRYING PAN.
APPLICATION FILED AUG. 23, 1911.
1,048,015.
Patented Dec. 24, 1912.
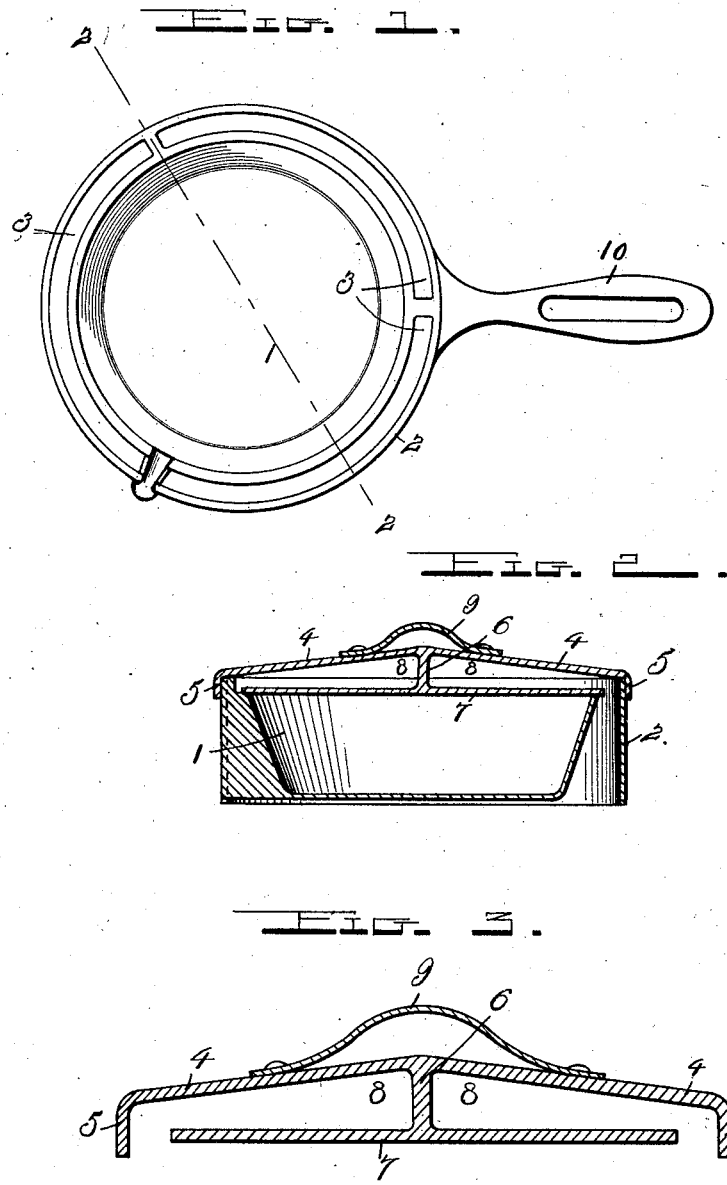
Witnesses
Inventors
John J. White
Leo M. Frederick.
By Victor J. Evans
Attorney

UNITED STATES PATENT OFFICE.

JOHN J. WHITE AND LEO M. FREDERICK, OF DENVER, COLORADO.

FRYING-PAN.

1,048,015. Specification of Letters Patent. Patented Dec. 24, 1912.

Application filed August 23, 1911. Serial No. 645,566.

*To all whom it may concern:*

Be it known that we, JOHN J. WHITE and LEO M. FREDERICK, citizens of the United States, residing at Denver, in the county of Denver and State of Colorado, have invented new and useful Improvements in Frying-Pans, of which the following is a specification.

This invention relates to cooking utensils and more particularly to frying pans or the like. Heretofore, in the use of this type of devices, a considerable amount of heat from the burner escaped around the pan and was wasted and no heat could be applied to the top of the pan.

It is the object of this invention to avoid these difficulties and broadly speaking the invention consists in constructing a frying pan in such a manner that the heat ordinarily wasted will be deflected to the top of the pan so that the contents thereof will be acted upon the same, or practically the same, as if placed in an oven, except greatly more intense.

Further objects of the invention will appear as the following specific description is read in connection with the accompanying drawing, which forms a part of this application, and in which:—

Figure 1 is a top plan view with the lid removed. Fig. 2 is a section on the line 2—2 of Fig. 1 with the lid applied, the lid being also in section. Fig. 3 is an enlarged sectional view of the lid.

Referring more particularly to the drawing, 1 represents an ordinary frying pan which is surrounded by a supporting ring 2 having a greater depth than the frying pan and being connected thereto by integral ribs 3 arranged at intervals around the pan. Preferably, the pan, the ring and the connecting ribs are cast as a unit and in such a manner that the upper edge of the ring is arranged slightly above the upper edge of the pan, and the lower edge is arranged slightly below the bottom of the pan, the space between the pans and the ring gradually converging from the bottom of the pan to the top, as shown.

As shown, the pan is provided with a cover 4 which is substantially cone-shaped and which is provided with a depending annular flange 5 at its edge to overhang the ring 2. This cover rests upon the ring and has depending from its center a post 6 upon which is suspended a flat top 7 having sufficient diameter to cover the top of the pan. The top is spaced away some little distance from the cover to produce a space 8 which receives the heat passing up through the space between the pan and the ring, the top of the pan thus receiving the heat ordinarily wasted around the sides of the pan. The ring has secured thereto a handle 10 and the cover is provided with a manipulating handle 9 by which it may be removed from the ring. A spout 11 is formed in the edge of pan 1 at a point at right angles to the handle 9 extending to and beyond the outer ring 2, and preferably connected to same, to enable liquid to be readily poured from the vessel.

Having thus described the invention what we claim as new is:—

A device of the class described comprising a pan, a ring surrounding and supported from the pan and having a greater depth than the pan, integral webs connecting the ring and the pan, a substantially cone-shaped cover seated upon the ring, and a top integrally connected to the underneath central portion of the cover and spaced therefrom and seated upon the pan, said top having a diameter equal to the diameter of the pan.

In testimony whereof we affix our signatures in presence of two witnesses.

JOHN J. WHITE.
LEO M. FREDERICK.

Witnesses:
WALTER A. MOFFAT,
SARA CORBETT.

---

Copies of this patent may be obtained for five cents each, by addressing the "Commissioner of Patents, Washington, D. C."